W. TAYLOR.
BUSHING SHEAVE FOR SHIPS' BLOCKS.
No. 11,510. Patented Aug. 8, 1854.
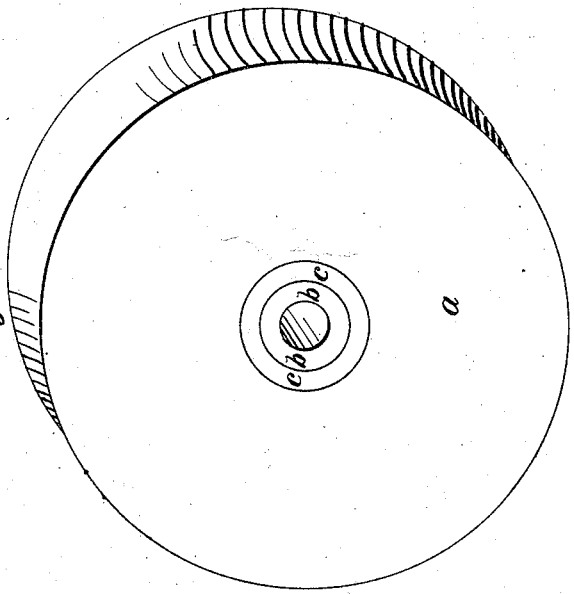
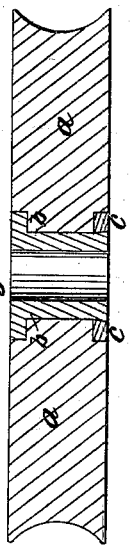
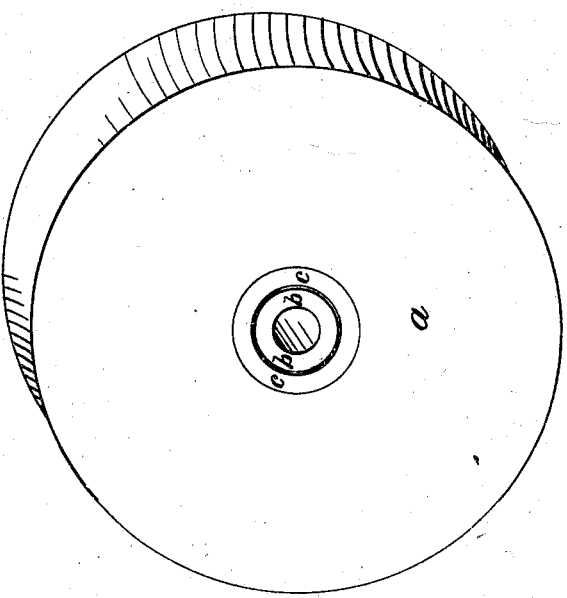
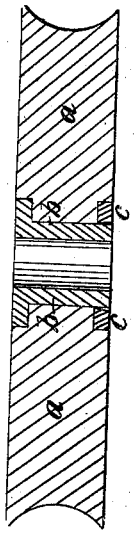
Witnesses:
A. E. Beach
Robt Macan
Inventor:
Weatherill Taylor

UNITED STATES PATENT OFFICE.

WEATHERILL TAYLOR, OF CAMPTOWN, NEW JERSEY.

BUSHING-SHEAVE FOR SHIPS' BLOCKS.

Specification of Letters Patent No. 11,510, dated August 8, 1854.

*To all whom it may concern:*

Be it known that I, WEATHERILL TAYLOR, of Camptown, in the county of Essex and State of New Jersey, have invented a new and useful Improvement in Ships' Blocks for Tackles, &c.; and I do hereby declare that the following is a full and exact description thereof.

To enable others skilled in the art to make and use my invention, I will proceed to describe its construction and operation, reference being had to the annexed drawings forming a part of this specification, in which, Figure 1, is a perspective view of a sheave furnished with my improvement, previous to fastening. Fig. 2, view after the fastening is completed. Fig. 3, section of bush and sheave previous to fastening. Fig. 4, the same, fastening completed.

Similar letters refer to like parts.

*a* is a sheave; *b* bush; *c* ring of bush.

In the ordinary method of making ships' blocks the bush is composed of a flanged barrel having one wide flange, and is secured in the center of the sheave by means of rivets which pass through the flange and rivet in the wood of the sheave, upon the opposite side of the latter.

This mode possesses several objections, such as the time required in fastening the bush, the expense, and the liability of the bush to tear out after the sheave has been a while in use, or on a severe strain. To obviate these objections a plan has been devised whereby the bush is secured without the use of any rivets or flanges.

This invention consists in composing the bush simply of a barrel upon which a screw-thread is cut or cast across its entire length. This screw-bush is then screwed into the center of the sheave, and the operation is complete. The invention I allude to was patented in 1844. This method is defective in several particulars. The tendency of the bush when thus screwed into the sheave is to burst the sheave asunder. The bush is entirely dependent upon the strength of the wood for the firmness with which it retains its position. The thread of the screw divides the holding parts of the wood so minutely that it is impossible for the bush thus screwed in to be retained with much force. When the sheave is subjected to great strain the bush soon becomes loose, the wooden threads of the screw breaking off, and the sheave becoming useless.

The objections to both the modes before described are entirely overcome by my improvement. The sheave, *a*, is made in the usual manner. A flanged bush, *b*, is passed through the sheave, and the other flange or rim, *c*, having its interior made flaring, is placed over the other end of the bush, *b*, as shown in Figs. 1 and 3. A swaging instrument is now introduced at that end of the bush over which the ring, *c*, has been placed, and the bush swaged out as seen in Figs. 2 and 4; which completes the operation, the two parts of the bush being solidly united and made to clasp the sheave between them like a vise.

By my method of fastening in the bush there is no tendency to burst asunder the sheave. On the contrary the tendency is to prevent it from bursting. By the act of swaging the flanges are made to bind with extraordinary force, the wood immediately between them, preventing the same from splitting under any circumstances. My improved mode of fastening the bush while it is speedily performed, is also, cheaper than either of the other modes described, screws and rivets being entirely dispensed with. By my mode the bush and the sheave are united almost as solidly as if they were one piece. No matter how great the strain, or how long a time in use, sheaves thus furnished never give out in consequence of any fault in the principle of fastening; neither do the bushes ever become loose or defective.

I claim—

The method herein described of securing the sheave to the bush.

WEATHERILL TAYLOR.

Witnesses:
  A. E. BEACH,
  ROBT. MACAN.